UNITED STATES PATENT OFFICE.

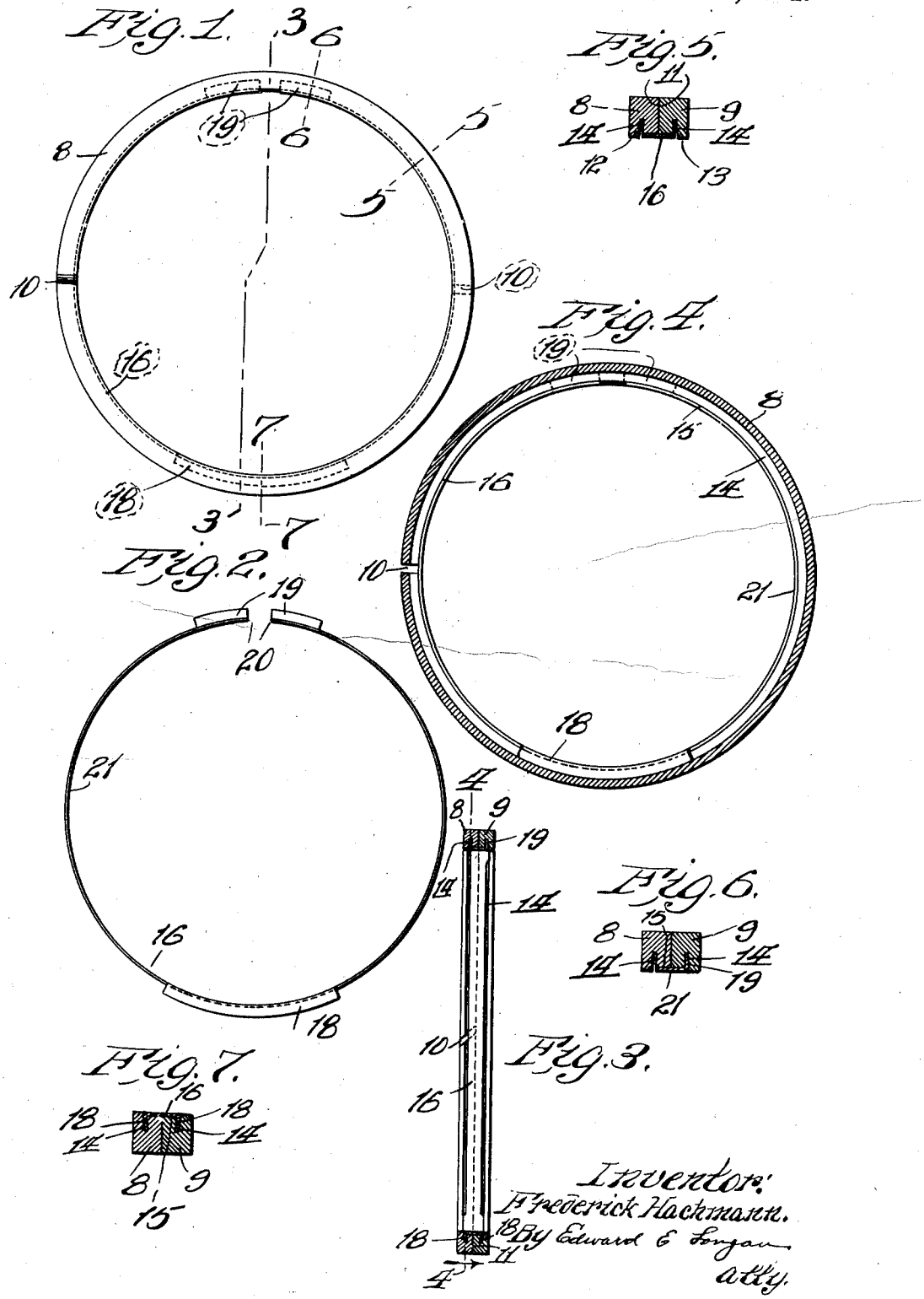

FREDERICK HACHMANN, OF ST. LOUIS, MISSOURI, ASSIGNOR OF ONE-HALF TO HERMAN C. STIFEL, OF ST. LOUIS, MISSOURI, ONE-SIXTEENTH TO PHILIP C. MOODY AND ONE-SIXTEENTH TO CHAUNCEY R. WATSON, BOTH OF DETROIT, MICHIGAN, AND ONE-EIGHTH TO DAVID M. HUTCHINSON, OF FERGUSON, MISSOURI.

PISTON-RING.

1,367,135.   Specification of Letters Patent.   Patented Feb. 1, 1921.

Application filed March 10, 1919. Serial No. 281,648.

*To all whom it may concern:*

Be it known that I, FREDERICK HACHMANN, a citizen of the United States, and resident of the city of St. Louis and State of Missouri, have invented certain new and useful Improvements in Piston-Rings, of which the following is a specification, containing a full, clear, and exact description, reference being had to the accompanying drawings, forming a part thereof.

This invention relates to improvements in piston rings and has for its object a piston ring composed of two sections, each of the sections being provided with an internal groove and a ring provided with flanges, the flanges of said ring entering into the grooves and holding the two sections of the ring together.

A further object is to provide a piston ring formed of two sections with a pair of internal grooves and a key member formed of spring material which has flanges adapted to enter each of the grooves and thus hold the two members tightly together.

Figure 1 is a plan view of a piston ring showing my keying ring or member in position.

Fig. 2 is a plan view of the keying ring made use of.

Fig. 3 is a cross section taken on the line 3—3 of Fig. 1.

Fig. 4 is a diametrical cross section taken on the line 4—4 of Fig. 3.

Fig. 5 is an enlarged cross section taken on the line 5—5 of Fig. 1.

Fig. 6 is an enlarged cross section taken on the line 6—6 of Fig. 1, and

Fig. 7 is an enlarged cross section taken on the line 7—7 of Fig. 1.

In the construction of my device, I provide a pair of rings 8 and 9, each ring being provided with the usual split or opening 10. The inner faces 11 are adapted to contact with each other and the splits 10 are so placed as to bring them diametrically opposite each other, thus providing a long lap, this being clearly shown in Fig. 1.

The faces 12 and 13 of the rings 8 and 9 respectively are provided with grooves 14, these grooves extending into the body of the rings and sloping slightly toward the faces 11. The central portion of the rings 8 and 9, or that portion between the grooves 14, is cut out as indicated by the numeral 15, thus forming a seat for the keying ring or member 16, making the inside surface of the ring absolutely flush.

The keying ring 16 is formed of a thin spring material and is provided approximately midway its ends with a pair of outturned converging flanges 18 and on one edge only of its ends with a flange 19. The flanges 19 are preferably formed on the same side of the ring and their purpose is that when the ring 16 is sprung or placed into the main piston ring, the flanges 19, entering the groove 14, will prevent the ends 20 of the ring 16 from moving up and down, or in other words, hold the ring against vibration. The flanges 18, being seated in the grooves 14, act as a key or clamp to hold the two sections 8 and 9 of the ring together so as to form practically one solid ring, while the vertical wall 21 of the ring 16 will prevent any carbon, which might get into the ring grooves cut into the piston from entering the joint or inner faces 11.

The ring 16, being formed of spring material adds additional resiliency to the piston ring and, as the ends or flanges 19 can slide freely in the grooves 14, there is no portion of the ring which does not have expansion. The incline of the grooves 14 gives additional clamping means when the flanges 18 are forced therein and also tends to prevent any sliding movement of the contacting faces 11 of the rings 8 and 9.

By the use of my device, it is possible to construct each section of the ring and finish it on all four faces. In fact, if found desirable, each ring may be ground on all four sides, thus assuring greater accuracy than is possible in most long-lap piston rings, and by the insertion of the ring 16, an additional amount of spring is given the ring over and above that contained in the material out of which the ring proper is formed.

The ring 16 is stamped out of sheet material and after the flanges 18 and 19 have been bent, the ring is rolled to a circle slightly larger than the inside diameter of the piston rings so as to exert an outward pressure all around the ring when the flanges are forced into the groove 14. By this construction, the sections of which the piston ring is composed are not weakened as is the case where holes are drilled in the contacting faces of the ring for riveting.

The flanges 19 formed on the end 20 of the ring 16 also serve the purpose of holding that portion of the rings 8 and 9, which is opposite the portion clamped together by the flanges 18, in close contact and in event that there is any tendency of the rings to separate, these flanges together with the flanges 18 will set up a torsion in the body portion 21 of the ring 16. Thus, it will be observed that the rings are tightly held together at all points.

Having fully described my invention, what I claim is:

1. A piston ring composed of two complementary finished split members, a substantially right angular groove cut in the inner face of each member, a split ring of spring material having outwardly turned converging flanges at approximately its center, said flanges adapted to be seated within the grooves and flanges formed at each end of said last mentioned ring, said flanges adapted to hold the two abutting rings together.

2. A piston ring composed of two finished split complementary members superimposed upon each other and so arranged that the split of one ring is diametrically opposite that of the other, a right angular groove cut in the inner face of each member adjacent their abutting edges, a split ring of spring material having outwardly turned parallel flanges, said flanges and ring adapted to be seated within the grooves for binding the two rings together.

3. A piston ring comprising two finished split complementary rings each of which is provided on its inner periphery with an L-shaped groove adjacent the contacting faces, one of said rings being superimposed on the other ring and the space between the ends of one ring being closed off by the body portion of the other ring, and a ring of spring material provided with out-turned parallel flanges adapted to be seated in one portion of the L-shaped grooves and the ring in the other portion of the grooves formed in the first mentioned rings for clamping and holding said rings together, the body portion of the last mentioned ring closing the joint formed by the contacting surfaces of the first mentioned rings.

4. A piston ring comprising two finished complementary split rings each of which is provided on its inner periphery with an L-shaped groove, one of said rings being superimposed upon the other ring and the space between the ends of one ring being closed off by the body of the other ring, a ring of spring material provided with a pair of out-turned flanges, said flanges being vertically opposite each other and adapted to be seated in the grooves formed in the first mentioned rings for clamping and holding said rings together, a single flange formed on each end of the last mentioned ring, said flanges adapted to be seated in the groove formed in one of the first mentioned rings only and acting as an additional securing means for holding the two first mentioned rings in close contact.

5. A piston ring comprising two finished split complementary rings each of which is provided on its inner periphery with an L-shaped groove, one of said rings being superimposed on the other ring and the space between the ends of one ring being closed by the other ring, and a split ring of spring material provided with a pair of centrally located out-turned flanges, said flanges being vertically opposite each other and adapted to be seated in the grooves formed in the first mentioned rings for clamping and holding said rings together, a single flange formed on each end of the last mentioned ring, said flanges adapted to be seated in the groove formed in one of the first mentioned rings only and acting as an additional securing means for holding the two first mentioned rings in close contact, the body portion of the last mentioned ring closing the joint formed by the contacting surfaces of the first mentioned rings.

In testimony whereof, I have signed my name to this specification, in presence of two subscribing witnesses.

FREDERICK HACHMANN.

Witnesses:
 EDNA L. BARKER,
 O. D. THOMPSON.